United States Patent
Zhou et al.

(10) Patent No.: US 11,727,928 B2
(45) Date of Patent: Aug. 15, 2023

(54) RESPONDING METHOD AND DEVICE, ELECTRONIC DEVICE AND STORAGE MEDIUM

(71) Applicant: Beijing Xiaomi Pinecone Electronics Co., Ltd., Beijing (CN)

(72) Inventors: Lingsong Zhou, Beijing (CN); Fei Xiang, Beijing (CN)

(73) Assignee: Beijing Xiaomi Pinecone Electronics Co., Ltd., Beijing (CN)

(*) Notice: Subject to any disclaimer, the term of this patent is extended or adjusted under 35 U.S.C. 154(b) by 232 days.

(21) Appl. No.: 16/942,494

(22) Filed: Jul. 29, 2020

(65) Prior Publication Data
US 2021/0225372 A1 Jul. 22, 2021

(30) Foreign Application Priority Data
Jan. 20, 2020 (CN) .......................... 202010062782.7

(51) Int. Cl.
*G10L 15/22* (2006.01)
*G10L 25/93* (2013.01)

(52) U.S. Cl.
CPC .............. *G10L 15/22* (2013.01); *G10L 25/93* (2013.01); *G10L 2015/223* (2013.01); *G10L 2025/937* (2013.01)

(58) Field of Classification Search
None
See application file for complete search history.

(56) References Cited

U.S. PATENT DOCUMENTS 8,995,972 B1  3/2015  Cronin
9,190,075 B1  11/2015  Cronin
(Continued)

FOREIGN PATENT DOCUMENTS

CN  2432652 Y  5/2001
CN  110364161 A  10/2019

OTHER PUBLICATIONS

Shaobin Gao, "Research and Design of Near Field Wireless Communication System Based on Acoustic Wave," May 2014 (with English Abstract), 95 pages.
(Continued)

*Primary Examiner* — Jonathan C Kim
(74) *Attorney, Agent, or Firm* — Oblon, McClelland, Maier & Neustadt, L.L.P.

(57) ABSTRACT

Aspects of the disclosure provide a responding method and device, an electronic device and a storage medium. The method is applied to a first electronic device including an audio acquisition component and an audio output component. The method can include acquiring a voice signal through the audio acquisition component, determining whether to respond to the voice signal, and responsive to determining to respond to the voice signal, outputting a first sound signal by the audio output component, the first sound signal being configured to notify at least one second electronic device that the first electronic device responds to the voice signal. In such a manner, an electronic device, responsive to determining to respond to a voice signal, outputs a sound signal to prevent other electronic device(s) from responding to the voice signal, so that competitions between electronic devices are reduced and a user experience is improved.

13 Claims, 8 Drawing Sheets

(56) References Cited

U.S. PATENT DOCUMENTS

| | | | |
|---|---|---|---|
| 2012/0034904 A1 | 2/2012 | Lebeau et al. | |
| 2012/0035931 A1* | 2/2012 | LeBeau | H04W 4/046 |
| | | | 704/E15.005 |
| 2013/0095805 A1 | 4/2013 | Lebeau et al. | |
| 2014/0108780 A1* | 4/2014 | Jin | H04B 11/00 |
| | | | 713/150 |
| 2015/0019230 A1* | 1/2015 | Zhao | G10L 19/018 |
| | | | 704/500 |
| 2015/0112691 A1 | 4/2015 | Lebeau et al. | |
| 2015/0310867 A1 | 10/2015 | Lebeau et al. | |
| 2015/0326911 A1* | 11/2015 | Burridge | H04N 21/43079 |
| | | | 386/202 |
| 2016/0072940 A1* | 3/2016 | Cronin | H04W 4/70 |
| | | | 455/414.1 |
| 2017/0206772 A1* | 7/2017 | Klimanis | G08B 25/007 |
| 2017/0317764 A1* | 11/2017 | Kim | H04L 27/22 |
| 2018/0025727 A1* | 1/2018 | Kume | G10L 17/22 |
| | | | 704/275 |
| 2018/0061419 A1* | 3/2018 | Melendo Casado | G10L 25/78 |
| 2018/0167147 A1* | 6/2018 | Almada | G10K 11/18 |
| 2018/0190264 A1* | 7/2018 | Mixter | H04L 51/224 |
| 2018/0228006 A1* | 8/2018 | Baker | G10L 15/22 |
| 2019/0385604 A1* | 12/2019 | Foerster | G10L 25/03 |
| 2019/0386796 A1* | 12/2019 | Melodia | H04L 27/2602 |
| 2020/0019373 A1* | 1/2020 | Abramson | G06F 9/453 |
| 2020/0043490 A1* | 2/2020 | Park | G06F 3/167 |
| 2020/0066279 A1* | 2/2020 | Kang | G10L 15/20 |
| 2020/0074988 A1* | 3/2020 | Park | G06N 3/045 |
| 2020/0169327 A1* | 5/2020 | Lin | H04L 1/0045 |
| 2020/0320994 A1* | 10/2020 | Totsuka | G06F 3/167 |
| 2020/0342869 A1* | 10/2020 | Lee | G10L 15/22 |
| 2021/0151059 A1* | 5/2021 | Zhou | G01S 7/539 |
| 2021/0225372 A1* | 7/2021 | Zhou | G10L 25/93 |
| 2021/0249016 A1* | 8/2021 | Foerster | G10L 15/26 |
| 2021/0366506 A1* | 11/2021 | Han | H04W 4/80 |
| 2022/0068271 A1* | 3/2022 | Berg | G10L 15/26 |
| 2022/0189488 A1* | 6/2022 | Leong | G10L 15/30 |
| 2022/0345820 A1* | 10/2022 | Dickins | H04R 5/04 |
| 2022/0366908 A1* | 11/2022 | Takahashi | G10L 15/22 |

OTHER PUBLICATIONS

Extended European Search Report dated Jan. 13, 2021 in European Patent Application No. 20188286.7, 8 pages.
Panagiotis Giannoulis, et al., "Room-Localized Speech Activity Detection in Multi-Microphone Smart Homes" Eurasip Journal on Audio, Speech, and Music Processing, vol. 2019, No. 1, XP055760616, Aug. 27, 2019, 23 pages.
First Office Action dated Sep. 29, 2022, in Chinese Patent Application No. 202010062782.7 filed Jan. 20, 2020, (with English language translation), 25 pages.
Yang Zhongming, "Introduction to Artificial Intelligence Applications", «Xidian University Press», P52. Oct. 2019 (7 pages).

* cited by examiner

US 11,727,928 B2

RESPONDING METHOD AND DEVICE, ELECTRONIC DEVICE AND STORAGE MEDIUM

CROSS-REFERENCE TO RELATED APPLICATION

This application is based upon and claims priority to Chinese patent application No. 202010062782.7, filed on Jan. 20, 2020, the entire contents of which are incorporated herein by reference.

TECHNICAL FIELD

The present disclosure generally relates to the technical field of artificial intelligence, and more particularly, to a responding method and device, an electronic device and a storage medium.

BACKGROUND

Along with the development of sciences and technologies, electronic devices have become more and more automatic and smart. Under the background of intellectualization, more and more intelligent devices have been applied to home environments such that it is very common that there are multiple intelligent devices in a home environment. A voice instruction is an entry for intelligent interaction. When there are multiple intelligent devices in the same home environment, there is such a condition that multiple electronic devices compete to respond to a voice instruction of a user or multiple responsive devices do not respond to avoid competitions, and consequently a degraded using experience may be brought to the user.

SUMMARY

According to a first aspect of the present disclosure, a responding method may be implemented by a first electronic device including an audio acquisition component and an audio output component. The method can include that a voice signal is acquired through the audio acquisition component, whether to respond to the voice signal is determined, and responsive to determining to respond to the voice signal, the audio output component outputs a first sound signal, the first sound signal being configured to notify at least one second electronic device that the first electronic device responds to the voice signal.

According to a second aspect of the present disclosure, an electronic device may include an audio acquisition component, configured to acquire a voice signal, a processor configured to determine whether to respond to the voice signal and, responsive to determining to respond to the voice signal, send a control signal, and an audio output component configured to output a first sound signal based on the control signal, the first sound signal being configured to notify at least one second electronic device that the first electronic device responds to the voice signal.

According to a third aspect of the present disclosure, a responding device may include a processor and a memory configured to store instructions executable by the processor. The processor may be configured to execute the instructions stored in the memory to implement any method of the first aspect.

According to a fourth aspect of the present disclosure, a non-transitory computer-readable storage medium is provided, which may have instructions stored thereon that, when executed by a processor of a responding device, enable the responding device to execute any method of the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

For ensuring that an electronic device required to make a response responds to a voice instruction when a user sends the voice instruction, each electronic device in the same home environment is required to be interconnected for communication in a local area network through wireless fidelity (WiFi). When the user sends a voice signal configured to awake the electronic devices, each electronic device may acquire the voice signal through a microphone (MIC), extract some features (for example, voice energy) from the voice signal and then share feature information with the other electronic devices in the same home environment through WiFi. Each electronic device may acquire the voice features acquired by the other electronic devices in the same local area network, and thus may decide whether itself is required to respond based on such data. Herein, all the electronic devices may make a decision based on the same data and the same decision method, and thus only one electronic device may finally respond to the user.

Under an ideal condition, this function may be smoothly executed. However in a practical environment, a network environment is complex, and network failure or long delay often occurs. In such a complex network environment, there may be such a condition that information collected by each electronic device is asymmetric and data in different electronic devices are different. Although a unified decision algorithm is adopted, multiple devices may decide to respond themselves and respond to a request of a user one after another. Such competition for responding may bring a degraded user experience.

Figure 1:
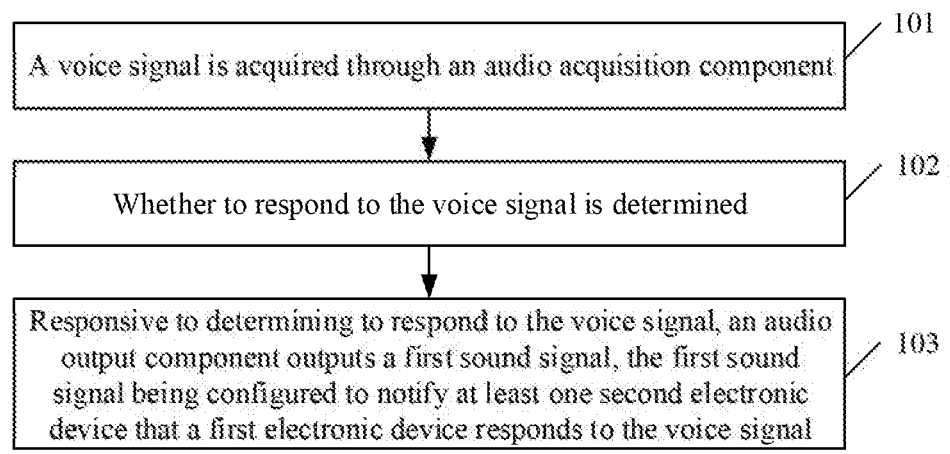
FIG. 1 is a first flowchart showing a responding method according to some embodiments.

Some embodiments of the present disclosure provide a responding method, which may be applied to a first electronic device including an audio acquisition component and an audio output component. FIG. 1 is a first flowchart showing a responding method according to some embodiments. As shown in FIG. 1, the method can include the following operations.

In Operation 101, a voice signal is acquired through the audio acquisition component.

In Operation 102, whether to respond to the voice signal is determined.

In Operation 103, responsive to determining to respond to the voice signal, the audio output component outputs a first sound signal, the first sound signal being configured to notify at least one second electronic device that the first electronic device responds to the voice signal.

It is to be noted that each of the first electronic device and the second electronic device may be any type of intelligent home device, such as a sweeping robot, an intelligent door lock, an intelligent television, an intelligent speaker, and the like. Each of the first electronic device and the second electronic device may also be any type of intelligent office equipment, such as a printer, an air conditioner, a fax machine, and the like. Each of the first electronic device and the second electronic device may include an audio acquisition component and an audio output component. The audio acquisition component is configured to acquire a voice signal sent by a user, and the audio output component is configured to output a sound signal. The audio acquisition component may include a MIC or a voice recorder, and the audio output component may include a speaker or a buzzer.

The first electronic device may be any electronic device capable of responding to a voice signal sent by a user. The second electronic device may be any other electronic device, other than the first electronic device, in the same home environment where the first electronic device is located. Therefore, both may acquire the voice signal.

Depending on different usages, the voice signal may be a voice signal for awaking or a voice signal configured to instruct the electronic device to execute an operation.

The first electronic device and the second electronic device may be in the same home environment and may communicate with each other. For example, the first electronic device and the second electronic device may be in the same house of the same user and may communicate with each other through the same local area network.

The first sound signal refers to a sound signal output by the audio output component of the first electronic device. Correspondingly, a second sound signal refers to a sound signal output by the audio output component of the second electronic device. The sound signal may be any sound signal transmitted through a carrier that may be a sound wave, for example, a voice or a ring.

The sound wave may include a sound wave audible to ears, an ultrasonic wave and/or a subsonic wave.

The sound signal sent by each electronic device is configured to notify at least one other electronic device that it responds to the voice signal sent by the user this time. For example, there may be three electronic devices A, B and C in the same home environment. When a user sends a voice signal, the electronic device A, once determining to respond to the voice signal, may output a sound signal A through the audio output component, the sound signal A being configured to notify the electronic device B and the electronic device C that the electronic device A is to respond to the voice signal sent by the user this time.

During a practical application, when a user sends a voice signal configured to awake electronic devices, the audio acquisition component of each electronic device (the first electronic device or the second electronic device) may acquire the voice signal.

Under an ideal condition, only one electronic device among electronic devices in the same home environment may determine to respond to a voice signal sent by a user every time due to a distance factor. However, during a practical operation, more than one electronic device may determine to respond to the voice signal. In the embodiments of the present disclosure, regardless of the number of the electronic devices determining to respond to the voice signal, each electronic device, once determining to respond to the voice signal, may output a sound signal through the audio output component. In such a manner, since transmission through the sound wave is more stable than WiFi, other devices may know, once a sound signal is output, that there is a certain electronic device to respond to the voice signal and thus may not respond to the voice signal anymore, which reduces competitions for responding.

The first electronic device, after acquiring the voice signal and once determining to respond to the voice signal, may control its audio output component to output the first sound signal to notify the other electronic device(s) through the first sound signal that the first electronic device responds to the voice signal sent by the user this time. Therefore, since a sound signal is sent responsive to determining to respond to a voice signal, it is ensured that only one electronic device responds to the voice signal of a user in the local area network, and a user experience is improved.

Figure 2:
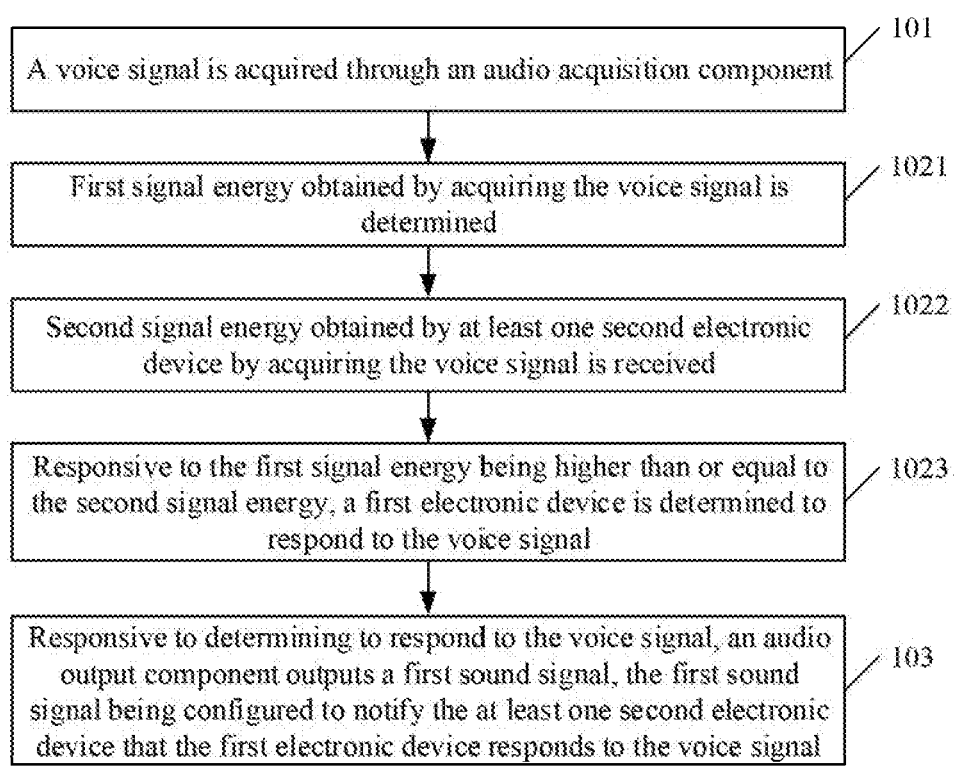
FIG. 2 is a second flowchart showing a responding method according to some embodiments.

FIG. 2 is a second flowchart showing an exemplary responding method according to some embodiments. As shown in FIG. 2, the operation in Operation 102 that whether to respond to the voice signal is determined can include the following operations.

In Operation 1021, first signal energy obtained by acquiring the voice signal is determined.

In Operation 1022, second signal energy obtained by the at least one second electronic device by acquiring the voice signal is received.

In Operation 1023, responsive to the first signal energy being higher than or equal to the second signal energy, the first electronic device is determined to respond to the voice signal.

The operation that whether to respond to the voice signal is determined may be implemented as follows: after the voice signal is acquired, some features of the acquired voice signal are extracted, and the features acquired by each electronic device are compared to determine whether to respond to the voice signal. Some features of the voice signal may include signal energy, noise signal or a signal to noise ratio. In the embodiments of the present disclosure, implementation of the operation in Operation 102 that whether to respond to the voice signal is determined is described with extraction of the signal energy obtained by acquiring the voice signal as an example.

In some implementations, each of the first signal energy and the second signal energy may be a ratio of received signal power of the voice signal acquired in unit time to a time length of the unit time.

In some embodiments, the first electronic device or the second electronic device may determine the signal energy obtained by itself by acquiring the voice signal through the following formula:

$$E_n = \frac{1}{T}\sum_{i}^{i+T}(x_n(t))^2,$$

where T represents a length of an awaking word, i.e., a length of the voice signal sent by the user, and takes frame as a unit; $E_n$ represents the signal energy obtained by the nth electronic device by acquiring the voice signal, n being the number of the electronic devices; and $X_n(t)$ (represents a time-domain signal of the voice signal acquired by the nth electronic device, t being present time. Herein, the signal energy specifically refers to average signal energy, i.e., an average value of the signal energy in a duration from the beginning of acquisition of the voice signal to the end of acquisition. The duration from the beginning of acquisition of the voice signal to the end of acquisition is T.

The first signal energy obtained by the first electronic device by acquiring the voice signal is $E_1$. Correspondingly, if there is one second electronic device, the second signal energy obtained by the second electronic device by acquiring the voice signal is $E_2$. If there are multiple second electronic devices, there are multiple pieces of second signal energy.

It is to be noted that, for ensuring that each electronic device may determine whether to respond to the voice signal, each electronic device, besides calculating the signal energy obtained by itself by acquiring the voice signal, may be also required to acquire the signal energy obtained by other electronic device(s) by acquiring the voice signal. In the embodiments of the present disclosure, the electronic devices may communicate through WiFi to share the signal energy obtained by themselves by acquiring the voice signal. In such a manner, the first device may receive the second signal energy sent by the at least one second electronic device and obtained by acquiring the voice signal, and if there are multiple second electronic devices, multiple pieces of second signal energy may be received.

For the first electronic device, the received second signal energy may be stored in a local memory. After the multiple pieces of second signal energy are acquired, the strengths of the first signal energy and the second signal energy may be compared.

Responsive to the first signal energy being higher than or equal to the second signal energy, the first electronic device may be determined to respond to the voice signal, namely the first electronic device decides to respond to the voice signal.

Therefore, in the manner of calculating the signal energy obtained by acquiring the voice signal and comparing the signal energy, whether to respond to the voice signal may be rapidly determined.

It is to be noted that, whether to respond to the voice signal may also be determined through signal to noise ratios obtained by acquiring the voice signal, specifically as follows: noise energy $E_{noise}$ of the voice signal may be further determined on the basis of determining the signal energy $E_n$ of the voice signal, and the signal to noise ratio SNR(n) of the acquired voice signal may be calculated based on the noise energy $E_{noise}$.

Herein, $E_{noise}(n)=\lambda E_{noise}(n-1)+(1-\lambda)E_a$, and $$SNR(n) = 10\log_{10}\frac{E_{voice}(n)}{E_{noise}(n)},$$

where $\lambda$ is a smoothing factor, and $E_{voice}(n)$ is the signal energy at a moment when the electronic device is awoken, i.e., transient signal energy.

After the energy of the other electronic devices is acquired, each electronic device may communicate through WiFi to share $E_n$ and signal to noise ratio SNR(n) calculated by itself to the other electronic devices, or, the devices may broadcast the signal energy obtained by themselves by taking sound waves as carriers. For example, the signal energy obtained by themselves by acquiring the voice signal may be sent by taking ultrasonic waves or subsonic waves as carriers. Furthermore, each electronic device may locally calculate:

maximum energy: $E_{max}=\max(E_1, E_2, \ldots E_n)$ and
a maximum signal to noise ratio $SNR_{max}=\max(SNR(1), SNR(2), \ldots SNR(n))$, to further determine whether to respond to the voice signal by taking both the maximum energy and the maximum signal to noise ratio into consideration. Once determining to respond, the electronic device may send a sound signal. Herein, the operation that whether to respond to the voice signal is decided by taking both the maximum energy and the maximum signal to noise ratio into consideration may be implemented by setting weights, namely the weights may be allocated between the maximum energy and the maximum signal to noise ratio and whether the first electronic device responds to the voice signal or not may be decided based on the weights.

Therefore, whether to respond to the voice signal may be rapidly determined by calculating the signal to noise ratio SNR(n) obtained by acquiring the voice signal and then comparing the signal to noise ratios SNR(n), or by taking both the signal energy $E_n$ and the signal to noise ratio SNR(n) into consideration, and thus a basis may be provided for subsequent processing.

It is to be noted that, during a practical application, distances between a user and electronic devices may be different and the signal energy calculated by each electronic device may thus be different. Then, for the condition that the first signal energy is equal to the second signal energy, the distances between the user and the two electronic devices are usually considered as the same, and in such a case, both the two electronic devices may determine to respond to the voice signal and may send sound signals. When the sound signals are these audible to the user, the user may hear only one sound because of synchronism. In such a case, the user may consider that only one electronic device responds and a degraded user experience caused by multiple sounds can be avoided.

Furthermore, in some implementations, the operation in Operation 1023 that the first electronic device is determined to respond to the voice signal responsive to the first signal energy being higher than or equal to the second signal energy may include that, responsive to the first signal energy being higher than or equal to the second signal energy and responsive to determining that a second sound wave signal indicating that the second electronic device responds to the voice signal is not detected before the first sound signal is output, the first electronic device is determined to respond to the voice signal.

As described above, during the practical application, due to a network failure or a long delay, there may be such a condition that information collected by each electronic device is asymmetric and data in different electronic devices are different. In an example, when some information cannot be instantly transmitted for a network reason, part of electronic devices have all information of $E_1 \sim E_n$, but the other devices may only have part of information of $E_1 \sim E_n$, and consequently, some electronic devices may decide that the signal energy obtained by themselves is higher than the received signal energy and thus determine to respond to the voice signal. In such a case, it is needed to further determine whether the second sound wave signal indicating that the second electronic device responds to the voice signal is detected before the first sound signal is output. If the second sound wave signal indicating that the second electronic device responds to the voice signal is not detected, it may be considered that no electronic device decides that its own signal energy is higher than the received signal energy, and in such a case, the first electronic device may respond to the voice signal.

The second sound wave signal may be detected in real time, namely the audio acquisition component in each electronic device may keep listening to sound wave information around at the same time while each electronic device calculates the respective signal energy and transmits the respective signal energy for sharing. Whether another electronic device has responded to the voice signal of the user or not may be judged through the situation of listening.

In such a manner, the audio acquisition component may listen to the sound wave information around, so that some electronic devices may be avoided from receiving insufficient signal energy due to a network condition to decide that the signal energy acquired by themselves is maximum and compete for responding, and it is further ensured that only one electronic device can respond every time when a user sends a voice signal.

Correspondingly, the operation that whether to respond to the voice signal is determined may further include that, responsive to the first signal energy being higher than or equal to the second signal energy and responsive to determining that the second sound wave signal indicating that the second electronic device responds to the voice signal is detected before the first sound signal is output, the first electronic device is determined to not respond to the voice signal.

Based on the above descriptions, if the first electronic device, before outputting the first sound signal responsive to deciding that the first signal energy is higher than or equal to the second signal energy, detects the second sound wave signal indicating that the second electronic device responds to the voice signal, the first electronic device may not receive all the signal energy due to the network condition and decide that the signal energy acquired by itself is maximum, and in such a case, responding to the voice signal may be canceled.

Therefore, detecting a sound wave signal around may avoid a response from the electronic device due to the network reason, thus further ensuring that only one electronic device can respond to the voice signal and also improving the responding accuracy.

It is to be noted that the operation that whether to respond to the voice signal is determined may further include that, responsive to the first signal energy being lower than the second signal energy, the first electronic device is determined to not respond to the voice signal.

Herein, responsive to the first signal energy being lower than the second signal energy, it may be considered that the first electronic device does not respond to the voice signal. In such a case, it may be considered that another electronic device closer to the user may execute the voice signal. Therefore, comparing the signal energy may determine not to respond to the voice signal, and misjudgments may be reduced based on the same judgment standard.

Figure 3:
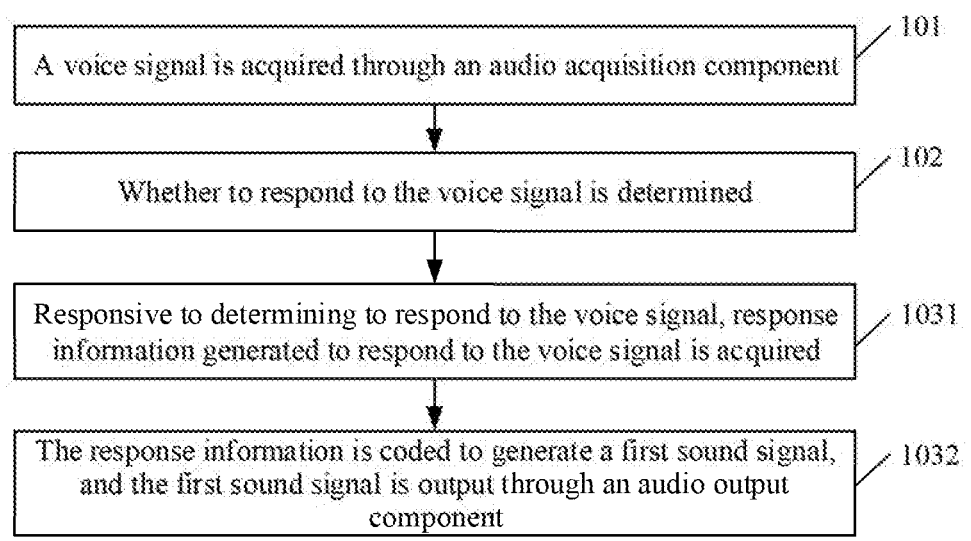
FIG. 3 is a third flowchart showing a responding method according to some embodiments.

FIG. 3 is a third flowchart showing an exemplary responding method according to some embodiments. As shown in FIG. 3, the operation in Operation 103 that the audio output component outputs the first sound signal responsive to determining to respond to the voice signal may include the following operations.

In Operation 1031, responsive to determining to respond to the voice signal, response information generated to respond to the voice signal is acquired.

In Operation 1032, the response information is coded to generate the first sound signal, and the first sound signal is output through the audio output component.

The response information may be any information, for example, text information, picture information or symbol information. The response information may be configured to, after being coded into the sound signal, notify the other electronic device(s) that the first electronic device responds to the voice signal.

The response information may be generated under the control of a processor of the first electronic device responsive to determining to respond to the voice signal. During specific implementation, preset response information may be stored in the first electronic device in advance. Responsive to determining to respond to the voice signal, the response information may be found under the control of the processor, or, responsive to determining to respond to the voice signal, the response information may be randomly generated under the control of the processor of the first electronic device. There are no limits made thereto in the embodiments of the present disclosure.

After the response information is acquired, the response information may be coded into the first sound signal, and the first sound signal may be output through the audio output component. The first sound signal may be a sound signal obtained by coding and modulation. The first sound signal may be processed, so that noise interference may be effectively avoided, and information transmission accuracy is improved.

Compared with WiFi, propagation of a sound wave signal can be stabilized at 340 m/s, a propagation speed can meet a requirement of a home environment, strong jitters can be avoided, and misjudgments caused by asymmetry of the information received by the electronic devices may be effectively reduced. Based on this, the response information may be coded into the first sound signal, and the first sound signal may be output through the audio output component, so that information exchange can be implemented on the basis of reducing information asymmetry, and a basis can be provided for ensuring that only one electronic device responds to the voice signal of a user every time in a home environment.

In some implementations, the operation in Operation 1032 that the response information is coded to generate the first sound signal may include that the response information is coded to obtain multiple coded values. Further, multiple adjacent coded values among the multiple coded values can be grouped into the same frame according to the number of the multiple coded values, one frame corresponding to the first sound signal with a predetermined time length, and the multiple coded values are modulated to a sound wave to form the first sound signal by taking the frame as a unit.

As described above, the response information may be text information, picture information or symbol information, etc. The operation in the embodiments of the present disclosure that the response information is coded to generate the sound signal is described herein with the condition that the response information is a character string as an example.

In some implementations, the operation that the response information is coded may be implemented as the response information is converted into a binary numerical value recognizable for a machine, and the binary coded value is converted into a coded value of another system according to a requirement, for example, an octal coded value or a hexadecimal coded value. For example, the response information may be coded into a binary coded value. If the response information is a character string "awaked", the American Standard Code for Information Interchange (ASCII) table may be queried to obtain coded values "0110 0001 01110111 0110 0001 0110 10110110 0101 0110 0100".

After the multiple coded values are obtained, multiple adjacent coded values among the multiple coded values may be grouped into the same frame according to the number of the multiple coded values. For example, a predetermined bit number of adjacent binary bits may be grouped into a frame. For example, the multiple adjacent coded values may be grouped into the same frame according to a coding sequence of each bit. For example, "0110 0001 01110111 0110 0001" among "0110 0001 0111 0111 0110 0001 0110 10110110 0101 0110 0100" may be grouped into a frame, and "0110 1011 0110 0101 0110 0100" may be grouped into another frame. In such a case, correspondingly, according to a mapping relationship of the ASCII table, "awa" may be grouped into a frame, and "ked" may be grouped into another frame. It is to be noted that division of the multiple coded values may be division of the response information.

After the frames are divided, the multiple coded values of character strings in the frames may be correspondingly modulated to the sound wave according to different frames to form the first sound signal.

It is to be noted that, during a practical application, the response information may also be transmitted as a frame, namely "awaked" may be transmitted as a frame. However, in the embodiments of the present disclosure, division of the response information may ensure that a small amount of information may be transmitted through each frame and further increase a coding and decoding speed of the information of each frame to achieve a higher transmission rate. In this manner, after a frame is coded and modulated, the first sound signal may be transmitted, so that the transmission rate can be increased, and unnecessary responding from the second electronic device to the voice signal can be reduced as much as possible.

The sound wave refers to a carrier transmitting the response information. In the embodiments of the present disclosure, for improving robustness to ambient noises and reducing interference to a user in a communication process, a sound wave of a certain frequency may be selected to transmit the response information. That is, the sound wave may include a sound wave with a frequency higher than a first preset frequency or sound wave with a frequency lower than a second preset frequency. The first preset frequency may be a minimum frequency of an ultrasonic wave, and the second preset frequency may be a maximum frequency of a subsonic wave.

The ultrasonic wave may be a sound wave with a frequency higher than 20,000 Hz, while a sound wave frequency audible to ears may be 20 Hz to 20,000 Hz, so that the ultrasonic wave may be a sound wave imperceptible to ears, and transmission of the information through the ultrasonic wave may reduce the interference to a user. Correspondingly, the subsonic wave may be a sound wave with a frequency lower than 20 Hz, and is also a sound wave imperceptible to the ears of the user, so that transmission of the information through the subsonic wave may also reduce the interference to a user. In addition, due to a frequency characteristic of the ultrasonic wave or the subsonic wave, the other electronic device(s) (for example, the second electronic device) may not recognize transmission of the sound signal, and information transmission security can be guaranteed to a certain extent.

Based on this, the first preset frequency may be 20,000 Hz, and the second preset frequency may be 20 Hz.

Transmission of the information via the sound wave higher than the first preset frequency or the sound wave lower than the second preset frequency may reduce the interference to a user in a communication process. In addition, energy of many background noises may be mainly concentrated in an intermediate/low frequency in a practical environment, so that transmission of the information at a high frequency or an ultra-low frequency may effectively avoid the noise interference. It is to be noted that, in this field, a low-frequency noise refers to a sound with a frequency lower than 200 Hz, specifically 20 Hz to 200 Hz.

Figure 4:
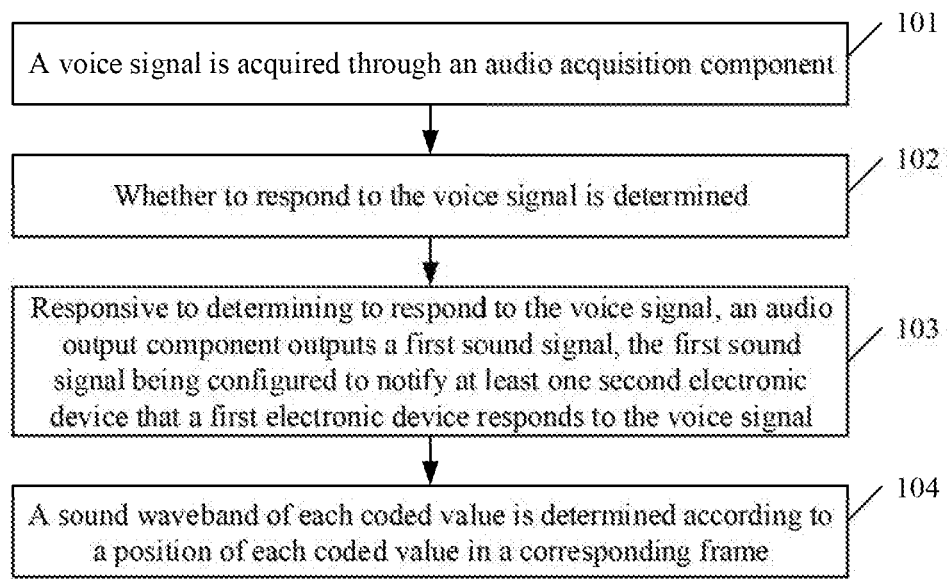
FIG. 4 is a fourth flowchart showing a responding method according to some embodiments.

FIG. 4 is a fourth flowchart showing a responding method according to some embodiments. As shown in FIG. 4, the method may further include the following operation.

In Operation 104, a sound waveband of each coded value is determined according to a position of each coded value in the corresponding frame.

The operation that the multiple coded values are modulated to the sound wave to form the first sound signal by taking the frame as the unit may include that each coded value is modulated to the sound wave of the determined sound waveband to form the first sound signal by taking the frame as the unit.

When the response information is transmitted through the sound wave, the response information may be required to be loaded or modulated to the corresponding sound wave for further being transmitted through the sound wave. Based on this, before modulation to the corresponding sound wave, it is needed to determine a sound waveband corresponding to the response information of each frame or sound wavebands corresponding to the multiple coded values of the response information of each frame. After the wavebands are determined, the multiple coded values of the response information of each frame may be modulated to the sound wave of the determined wavebands to form the sound signal.

In other words, after the sound waveband corresponding to the response information of each frame is determined, an amplitude of the sound waveband may be set to be a first amplitude, and an amplitude of another sound waveband may be set to be a second amplitude. The first amplitude may be 1, and the second amplitude may be 0. The sound wave may be modulated through different amplitudes.

Figure 5:
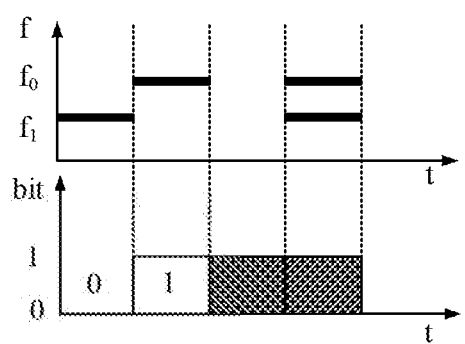
FIG. 5 is a schematic diagram illustrating carrier modulation through two binary values.

Modulation of the sound wave may be shown in FIG. 5. FIG. 5 is a schematic diagram illustrating carrier modulation through two binary values. As shown in FIG. 5, the frequency f0 represents 1, and the frequency f1 represents 0. During practical transmission, an absolute amplitude of a received signal may be impacted by factors such as playing power and a transmission distance, so that relative amplitudes of f0 and f1 may be practically compared to judge a numerical value. When f0>f1, there is no f0 but the frequency f0; and when f1>f0, there is no f0 but the frequency f1. Therefore, a carrier may be modulated with two different frequencies nearby the frequency of the carrier.

In an example, for the first electronic device, if the acquired response information is "awaked", "awaked" may be coded and further divided into different frames to increase a transmission rate. After a sound waveband corresponding to each frame is determined, if the sound waveband corresponding to the frame where "awa" is located is 2,100 Hz to 2,300 Hz, coded values of "awa" in the frame where "awa" is located may be modulated to the sound wave of 2,100 Hz to 2,300 Hz.

The position of each coded value in a frame may be a position of each character string in each frame within the frame. For example, first "a" in "awaked" is before "w", and a position of a coded value of the first "a" in the corresponding frame may also be before a coded value of "w", so that a band corresponding to "a" is also before a band of "w". For example, if there are six bands for "awaked": f0~f15, f16~f31, f32~f47, f48~f63, f64~f79 and f80~f95, then when the first "a" corresponds to f0~f15, "w" corresponds to f6~f31.

Accordingly, determining the sound wavebands for modulation of the multiple coded values in each frame may provide a basis for subsequently modulation of the multiple coded values to the sound wave of the determined sound wavebands to form the first sound signal.

However, it is to be noted that, for further increasing the transmission rate, a multi-frequency manner may be adopted for transmission in the embodiments of the present disclosure. That is, for "awaked", each character may correspond to a band under a normal condition. However, in the embodiments of the present disclosure, the response information may be divided into multiple segments for modulation. Due to existence of multiple modulation frequency points, the coding and decoding speed may be further increased, and the transmission rate may be further increased.

Based on this, the operation that each coded value is modulated to the sound wave of the determined sound waveband to form the first sound signal may include that sound wave frequencies corresponding to values of the multiple coded values within the sound wavebands are determined. Further, the multiple coded values can be modulated to the sound wave with the sound wave frequencies corresponding to the values to form the first sound signal.

During a practical application, since each character string occupies eight bits, coded values of each character string may be divided into coded values of higher four bits and lower four bits, and a modulation band may be selected for every four bits for modulation. For example, for "awaked", the binary coded values "0110 000101110111 0110 0001 0110 10110110 01010110 0100" may be divided into coded values of higher four bits and lower four bits. That is, "a" is taken as an example. The coded value of "a" is "0110 0001", and after division, the corresponding higher four bits are "0110" and the lower four bits are "0001".

For determining a modulation frequency point for each four-bit coded value obtained by division or determining a sound wave frequency for modulation after the multiple coded values are divided, a manner of determining the sound wave frequencies corresponding to the values of the multiple coded values within the sound wavebands based on the values of the multiple coded values is proposed in the embodiments of the present disclosure. That is, the operation that the sound wave frequencies corresponding to the values of the multiple coded values within the sound wavebands are determined may be implemented as follows: a hexadecimal value corresponding to the response information is determined; and a sound wave frequency is selected from a sound waveband according to a magnitude of the value.

Taking "a" as an example. The coded value of "a" is "0110 0001", and after division, the corresponding higher four bits are "0110" and the lower four bits are "0001", namely "0110 0001" may be converted into a hexadecimal numerical value "61", then the corresponding higher four bits "0110" may correspond to "6", the lower four bits "0001" may correspond to "1", and a sound wave frequency may be selected from a carrier band according to a sequence from high to low. If "a" is the first bit in the character string, since "a" corresponds to two modulation frequency points in the embodiments of the present disclosure, two frequencies may be selected from f0~f15 and f16~f31 as corresponding sound wave frequencies respectively. Selection may be performed according to the hexadecimal value corresponding to "a", namely the hexadecimal value corresponding to "a" is 61, and a frequency may be selected from the corresponding band f0~f15 from "1" of the lower four bits. Since the hexadecimal value is 1, a frequency may be selected from the first frequency f0 of the band according to a sequence of values, namely f0+1=f1, and the sound wave frequency determined for "1" of the lower four bits is f1. Then, a frequency may be selected for "6" of the higher four bits, namely the frequency may be selected from the corresponding band f16~f31, in such case, the frequency may be selected from the first frequency f16 of the band according to a sequence of values, namely f16+6=f22, and the sound wave frequency determined by "6" of the higher four bits is f22.

By parity of reasoning, the response information "awaked" may be coded into binary "0110 0001 0111 0111 0110 0001 0110 1011 0110 0101 0110 0100" and then converted into hexadecimal "61 77 61 6B 65 64". Correspondingly, the higher four bits and lower four bits may be as follows: for example, for "6B", "6" is the higher four bits and "B" is the lower four bits. The corresponding sound wave frequencies to which the multiple coded values of the higher four bits and the lower four bits are required to be adjusted may be determined respectively, namely, in "6B", "B" corresponds to f11 and "6" corresponds to f22.

It is to be noted that the response information "awaked" may be divided into multiple frames, for example, two frames, i.e., "awa" and "ked". Each character string may be further divided to two sound wave frequencies according to higher four bits and lower four bits. In such a case, there are six modulation frequency points for the frame where "awa" is located, i.e., "f1 f22 f39 f55 f5 f86", as described above, and there are also six modulation frequency points for the frame where "ked" is located, i.e., "f11 f22 37 f54 f68 f86".

Therefore, the sound signal may be formed in the above-mentioned coding form and modulation manner.

Figure 6:
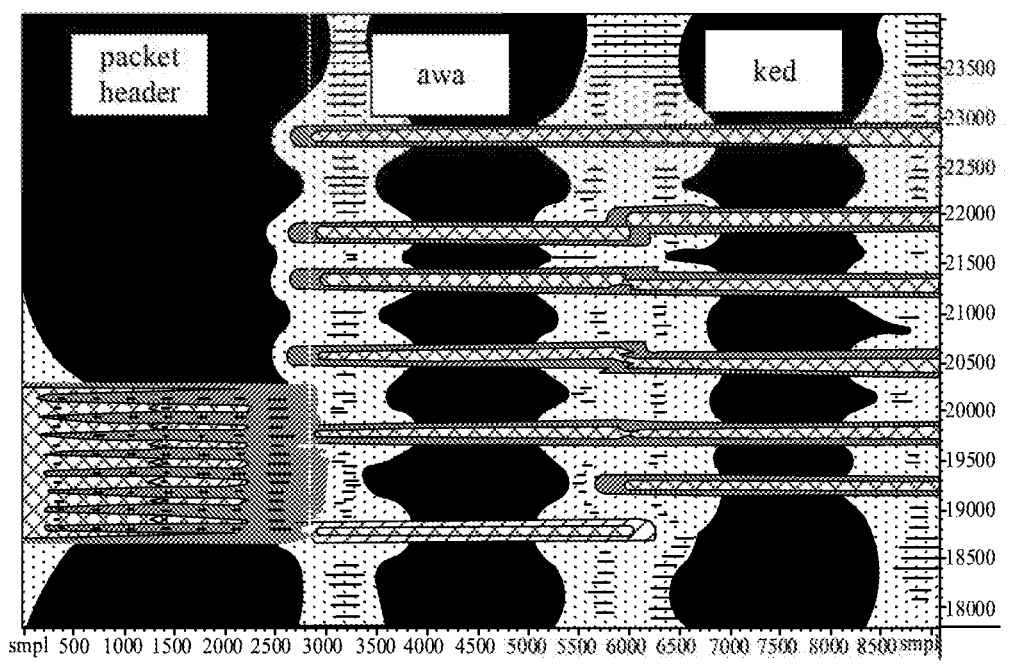
FIG. 6 is a schematic diagram illustrating sound data obtained after "awaked" is modulated and coded.

FIG. 6 is a schematic diagram illustrating sound data obtained after "awaked" is modulated and coded. As shown in FIG. 6, the response information "awaked" may be divided into the two frames "awa" and "ked", each frame may be adjusted, and in each corresponding band, a frequency may be selected for each frame and modulation may be performed at the frequency, thereby transmitting a corresponding signal. A packet header may be in a fixed format, and may be configured to notify the receiving electronic device that subsequent data is valid information. The packet header may consist of frequencies f0~f31, and amplitudes at the frequencies may be sequentially "1010101010101010101010101010", 1 representing a maximum amplitude.

It is to be noted that dividing the response information "awaked" into the two frames "awa" and "ked" is only an example for description and, during a practical application, the response information "awaked" may also be divided into three frames "aw", "ak" and "ed". When it is divided into the three frames, the sound wave transmitting the three frames "aw", "ak" and "ed" is correspondingly required to be divided into four groups, each character string corresponding to two groups of sound wavebands, to further determine the sound wave corresponding to the modulation frequencies.

In such a manner, the response information may be coded into the sound signal capable of effectively avoiding the noise interference in the abovementioned coding manner, and the sound signal may further be output to prevent the other device(s) from being awoken, so that it is ensured that only one electronic device responds to the voice signal of the user in the same home environment, and the user experience is greatly improved.

Figure 7:
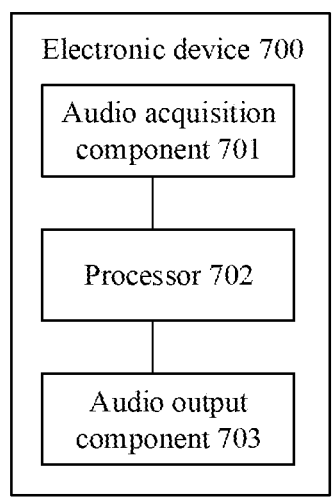
FIG. 7 is a structure diagram of an electronic device according to some embodiments.

For ensuring that only one electronic device responds to a voice signal of a user every time in a home environment, the embodiments of the present disclosure also provide an electronic device. FIG. 7 is a structure diagram of an electronic device according to some embodiments. As shown in FIG. 7, the electronic device 700 includes an audio acquisition component 701 that can be configured to acquire a voice signal. Further, the electronic device 700 can include a processor 702 that can be configured to determine whether to respond to the voice signal and, responsive to determining to respond to the voice signal, send a control signal, and an audio output component 703 that is configured to output a first sound signal based on the control signal, the first sound signal being configured to notify at least one second electronic device that the first electronic device responds to the voice signal.

In some implementations, the processor may be further configured to determine first signal energy obtained by acquiring the voice signal. The electronic device 700 may further include a communication interface that can be configured to receive second signal energy obtained by the at least one second electronic device by acquiring the voice signal, and the processor can be further configured to, responsive to the first signal energy being higher than or equal to the second signal energy, determine the first electronic device to respond to the voice signal.

In some implementations, the processor may be further configured to, responsive to determining to respond to the voice signal, acquire response information generated to respond to the voice signal and code the response information to generate the first sound signal, and an audio output sub-component may be configured to output the first sound signal.

In some implementations, the processor may be further configured to code a character string corresponding to the response information to obtain multiple coded values, group multiple adjacent coded values among the multiple coded values into a frame according to the number of the multiple coded values, the frame corresponding to the first sound signal with a predetermined time length, and modulate the multiple coded values to a sound wave to form the first sound signal by taking the frame as a unit.

In some implementations, the processor may be further configured to determine a sound waveband of each coded value according to a position of each coded value in the corresponding frame, and may be further configured to modulate each coded value to the sound wave of the determined sound waveband to form the first sound signal by taking the frame as the unit.

In some implementations, the processor may be further configured to determine sound wave frequencies corresponding to values of the multiple coded values within the sound wavebands and modulate the multiple coded values to the sound wave with the sound wave frequencies corresponding to the values to form the first sound signal.

In some implementations, the sound wave may include a sound wave with a frequency higher than a first preset frequency, the first preset frequency being a minimum frequency of an ultrasonic wave or a sound wave with a frequency lower than a second preset frequency, the second preset frequency being a maximum frequency of a subsonic wave.

The processor may be further configured to, responsive to the first signal energy being higher than or equal to the second signal energy and responsive to determining that a second sound wave signal indicating that the second electronic device responds to the voice signal is not detected before the first sound signal is output, determine the first electronic device to respond to the voice signal.

Additionally, the processor may be further configured to, responsive to the first signal energy being higher than or equal to the second signal energy and responsive to determining that the second sound wave signal indicating that the second electronic device responds to the voice signal is detected before the first sound signal is output, determine the first electronic device to not respond to the voice signal.

Further, in some implementations, the processor may be further configured to, responsive to the first signal energy being lower than the second signal energy, determine the first electronic device to not respond to the voice signal.

Therefore, the electronic device, after acquiring a voice signal and responsive to determining to respond to the voice signal, may control its audio output component to output a sound signal to notify other electronic device(s) through the sound signal that the electronic device responds to the voice signal sent by a user this time. Therefore, the sound signal may be sent out responsive to determining to respond, it is ensured that only one electronic device can respond to the voice signal of the user in the same home environment, and a user experience is improved.

With respect to the device in the above embodiments, the specific manners for performing operations for individual components therein have been described in detail in the embodiments regarding the method, which will not be elaborated herein.

Figure 8:
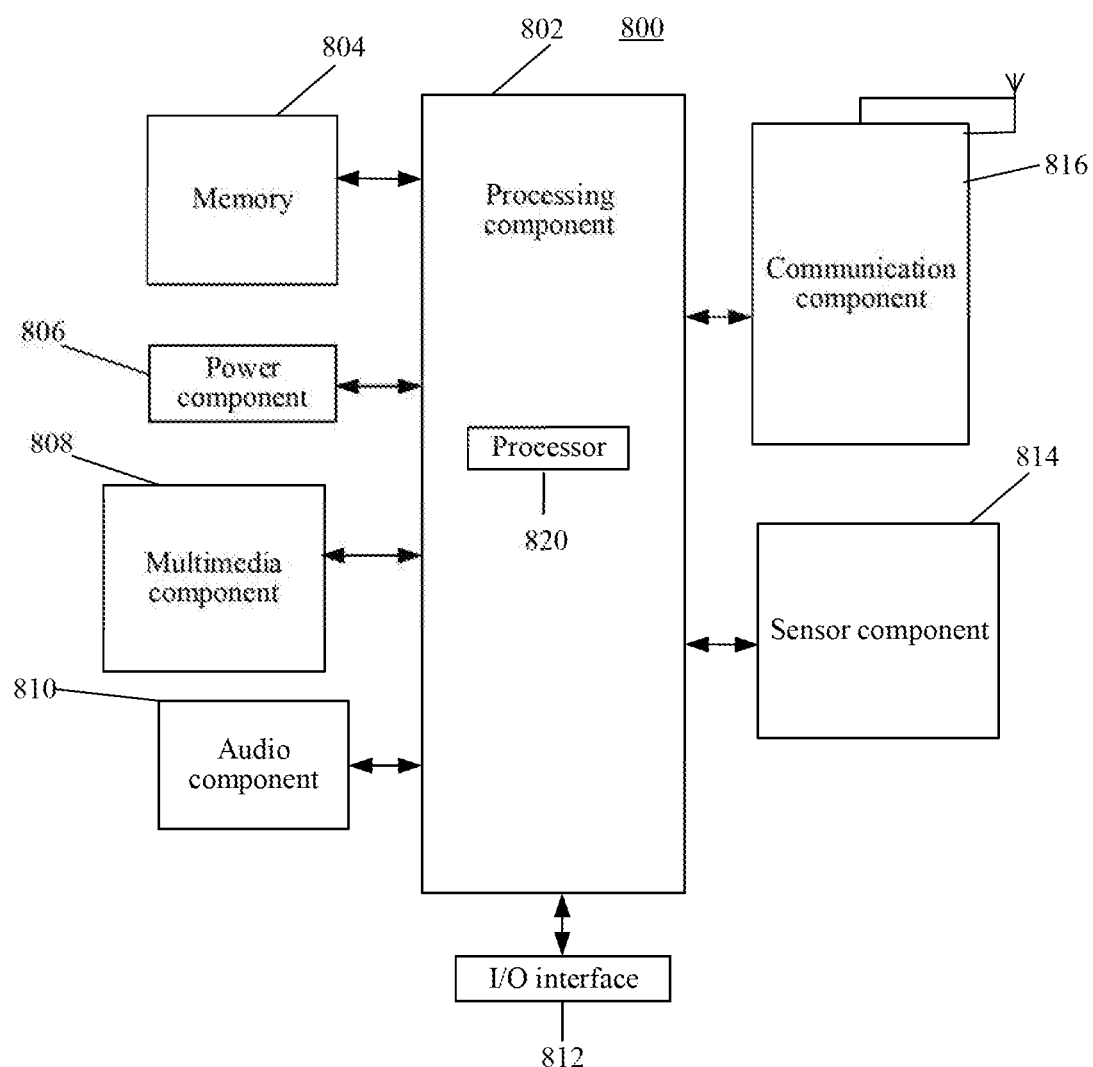
FIG. 8 is a block diagram of a responding device according to some embodiments.

FIG. 8 is a block diagram of a responding device 800 according to some embodiments. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may further include one or more components which facilitate interaction between the processing component 802 and the other components. For instance, the processing component 802 may include a multimedia component to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen providing an output interface between the device 800 and a user. In some implementations, the screen may include a Liquid Crystal Display (LCD) and aTouch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some implementations, the multimedia component 808 includes a front camera and/or a rear camera. The front camera and/or the rear camera may receive external multimedia data when the device 800 is in an operation mode, such as a photographing mode or a video mode. Each of the front camera and/or the rear camera may be a fixed optical lens system or have focusing and optical zooming capabilities.

The audio component 810 is configured to output and/or input an audio signal. For example, the audio component 810 includes a MIC, and the MIC is configured to receive an external audio signal when the device 800 is in the operation mode, such as a call mode, a recording mode and a voice recognition mode. The received audio signal may further be stored in the memory 804 or sent through the communication component 816. In some implementations, the audio component 810 further includes a speaker configured to output the audio signal.

The I/O interface 812 may provide an interface between the processing component 802 and a peripheral interface, and the peripheral interface may be a keyboard, a click wheel, a button and the like. The button may include, but not limited to a home button, a volume button, a starting button, and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some implementations, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a WiFi network, a 2nd-Generation (2G) or 3rd-Generation (3G) network or a combination thereof. In some implementations, the communication component 816 may receive a broadcast signal or broadcast associated information from an external broadcast management system through a broadcast channel. In some implementations, the communication component 816 further includes a Near Field Communication (NFC) component to facilitate short-range communication. For example, the NFC component may be implemented based on a Radio Frequency Identification (RFID) technology, an Infrared Data Association (IrDA) technology, an Ultra-WideBand (UWB) technology, a Bluetooth (BT) technology or another technology.

In some implementations, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 804 including instructions, and the instructions may be executed by the processor 820 of the device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

According to a non-transitory computer-readable storage medium, instructions in the storage medium may be executed by a processor of a responding device to enable the responding device to implement the method of each abovementioned embodiments.

Other implementations of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A responding method that is implemented by a first electronic device having an audio acquisition component and an audio output component, the audio acquisition component being a microphone or a recorder, and the audio output component being a speaker or a buzzer, the responding method comprising:
  acquiring a voice signal through the audio acquisition component;
  determining whether to respond to the voice signal; and
  outputting a first sound signal by the audio output component in response to the voice signal, the first sound signal being configured to notify at least one second electronic device that the first electronic device responds to the voice signal,
  wherein determining whether to respond to the voice signal further comprises:
    determining a first signal energy obtained from acquiring the voice signal;
    receiving a second signal energy of the at least one second electronic device obtained from acquiring the voice signal; and
    determining to respond to the voice signal in response to the first signal energy being higher than or equal to the second signal energy,
  wherein determining to respond to the voice signal in response to the first signal energy being higher than or equal to the second signal energy further comprises:
    responsive to the first signal energy being higher than or equal to the second signal energy and responsive to determining that a second sound wave signal indicating that the second electronic device responds to the voice signal is not detected before the first sound signal is output, determining the first electronic device to respond to the voice signal; and
    responsive to the first signal energy being higher than or equal to the second signal energy and responsive to determining that a second sound wave signal indicating that the second electronic device responds to the voice signal is detected before the first sound signal is output, determining the first electronic device to not respond to the voice signal.

2. The responding method of claim 1, wherein outputting the first sound signal by the audio output component in response to the voice signal further comprises:
  responsive to determining to respond to the voice signal, acquiring response information generated to respond to the voice signal;
  coding the response information to generate the first sound signal; and
  outputting the first sound signal through the audio output component.

3. The responding method of claim 2, wherein coding the response information to generate the first sound signal further comprises:
  coding the response information to obtain multiple coded values;
  grouping multiple adjacent coded values among the multiple coded values into a frame according to the number of the multiple coded values, where the frame corresponding to the first sound signal has a predetermined time length; and
  modulating the multiple coded values to a sound wave to form the first sound signal by taking the frame as a unit.

4. The responding method of claim 3, further comprising:
  determining a sound waveband of each coded value according to a position of each coded value in a corresponding frame, and
  wherein modulating the multiple coded values to the sound wave to form the first sound signal by taking the frame as the unit further includes:
  modulating each coded value to the sound wave of the determined sound waveband to form the first sound signal by taking the frame as the unit.

5. The responding method of claim 4, wherein modulating each coded value to the sound wave of the determined sound waveband to form the first sound signal further comprises:
  determining sound wave frequencies corresponding to values of the multiple coded values within the sound wavebands; and
  modulating the multiple coded values to the sound wave with the sound wave frequencies corresponding to the values to form the first sound signal.

6. The responding method of claim 3, wherein the sound wave comprises:
  a sound wave with a frequency higher than a first preset frequency, the first preset frequency being a minimum frequency of an ultrasonic wave; or
  a sound wave with a frequency lower than a second preset frequency, the second preset frequency being a maximum frequency of a subsonic wave.

7. An electronic device, comprising:
  an audio acquisition component that is configured to acquire a voice signal;
  a processor that is configured to determine whether to respond to the voice signal and, responsive to determining to respond to the voice signal, send a control signal; and
  an audio output component that is configured to output a first sound signal based on the control signal, the first sound signal being configured to notify at least one second electronic device that the electronic device responds to the voice signal,
  wherein:
  the audio acquisition component is a microphone or a recorder,
  the audio output component is a speaker or a buzzer,
  the processor is further configured to determine first signal energy obtained by acquiring the voice signal,
  the electronic device further comprises: a communication interface configured to receive second signal energy obtained by the at least one second electronic device by acquiring the voice signal;
  the processor is further configured to, in response to the first signal energy being higher than or equal to the second signal energy, determine the electronic device to respond to the voice signal,
  wherein the processor is further configured to:
    responsive to the first signal energy being higher than or equal to the second signal energy and responsive to determining that a second sound wave signal indicating that the second electronic device responds to the voice signal is not detected before the first sound signal is output, determine the electronic device to respond to the voice signal; and responsive to the first signal energy being higher than or equal to the second signal energy and responsive to determining that a second sound wave signal indicating that the second electronic device responds to the voice signal is detected before the first sound signal is output, determine the electronic device to not respond to the voice signal.

8. The electronic device of claim 7, wherein:

the processor is further configured to, responsive to determining to respond to the voice signal, acquire response information generated to respond to the voice signal and code the response information to generate the first sound signal, and the audio output component is configured to output the first sound signal.

9. The electronic device of claim 8, wherein the processor is further configured to code the response information to obtain multiple coded values, group multiple adjacent coded values among the multiple coded values into a frame according to the number of the multiple coded values, the frame corresponding to the first sound signal with a predetermined time length, and is configured to modulate the multiple coded values to a sound wave to form the first sound signal by taking the frame as a unit.

10. The electronic device of claim 9, wherein the processor is further configured to:

determine a sound waveband of each coded value according to a position of each coded value in a corresponding frame, and modulate each coded value to the sound wave of the determined sound waveband to form the first sound signal by taking the frame as the unit.

11. The electronic device of claim 10, wherein the processor is further configured to determine sound wave frequencies corresponding to values of the multiple coded values within the sound wavebands and modulate the multiple coded values to the sound wave with the sound wave frequencies corresponding to the values to form the first sound signal.

12. The electronic device of claim 9, wherein the sound wave comprises:

a sound wave with a frequency higher than a first preset frequency, the first preset frequency being a minimum frequency of an ultrasonic wave; or a sound wave with a frequency lower than a second preset frequency, the second preset frequency being a maximum frequency of a subsonic wave.

13. A non-transitory computer-readable storage medium, having instructions stored thereon that, when executed by a processor of a responding device, enable the responding device to execute the method of claim 1.

* * * * *